United States Patent Office
3,233,832
Patented Feb. 8, 1966

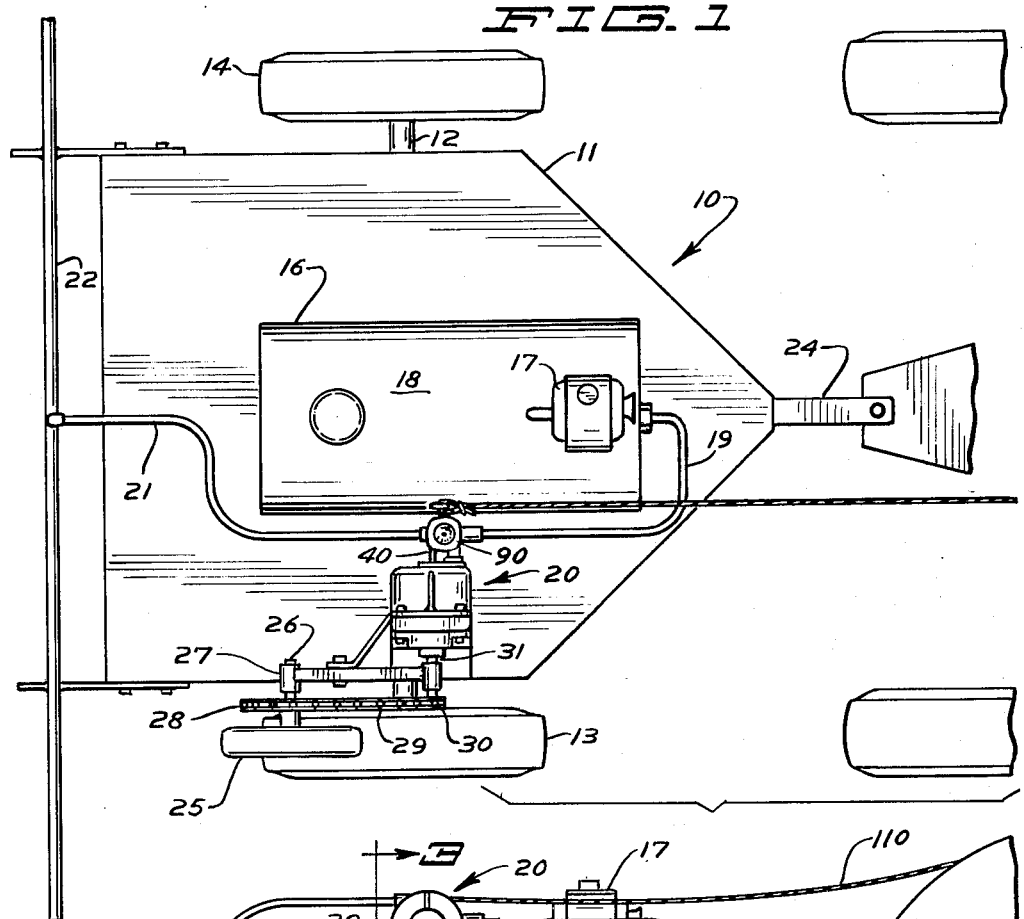
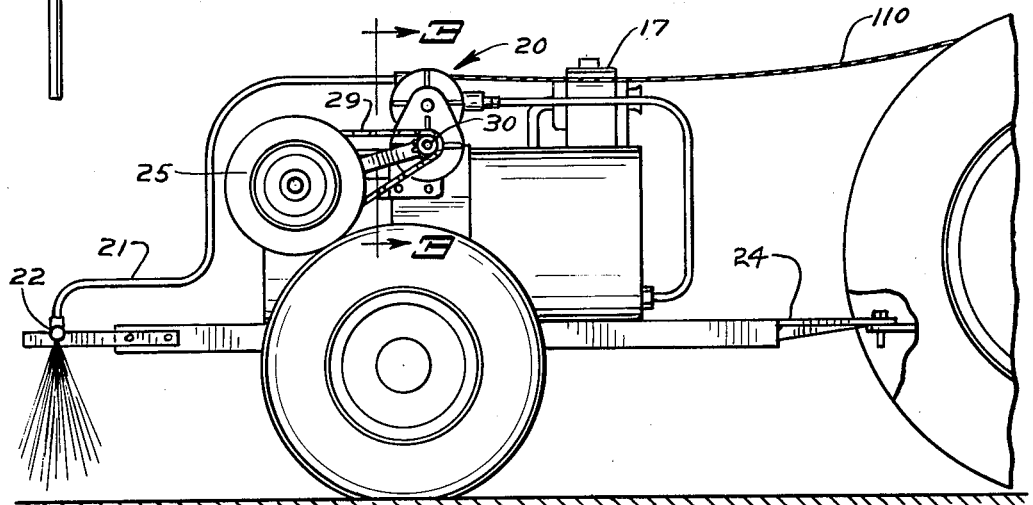

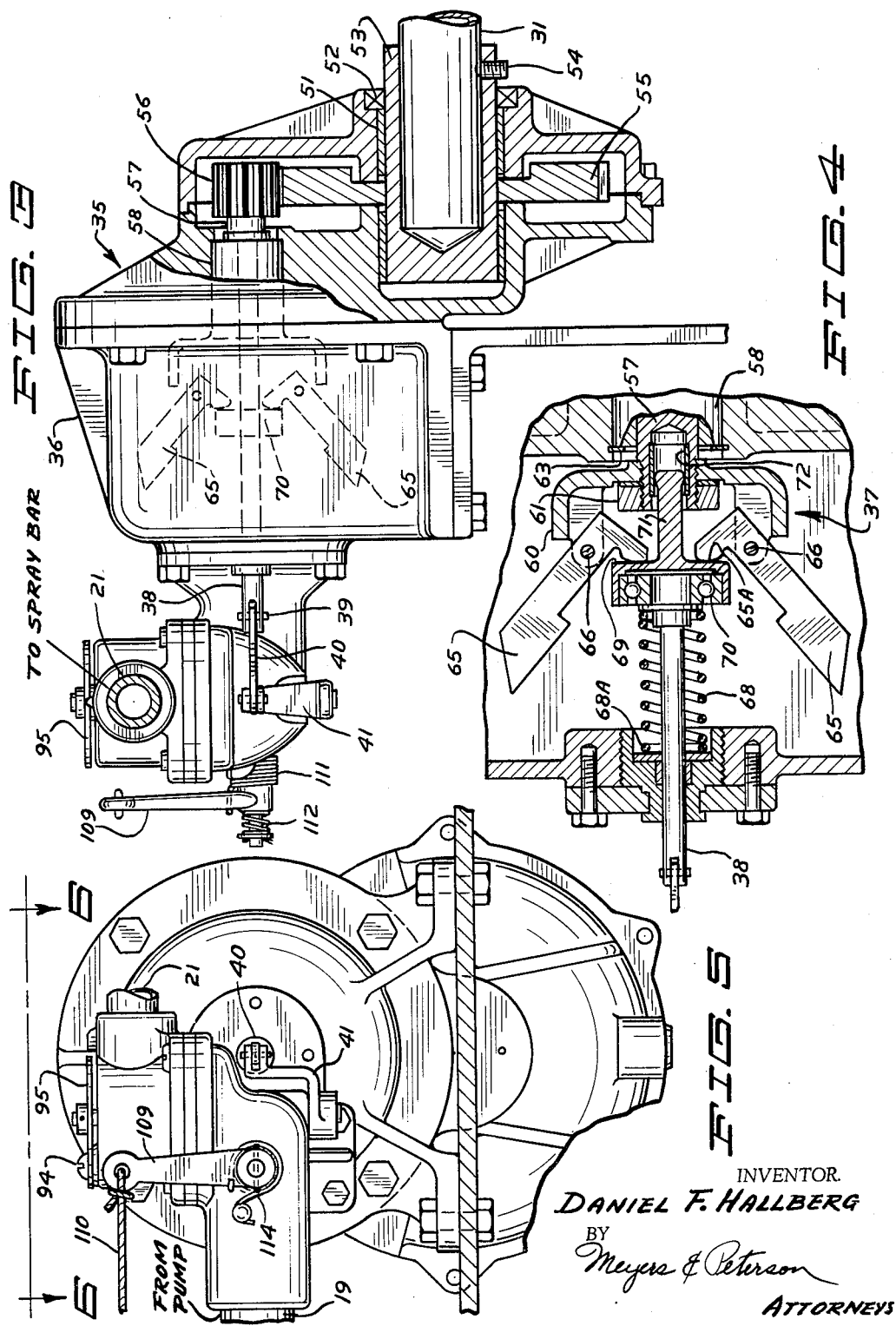

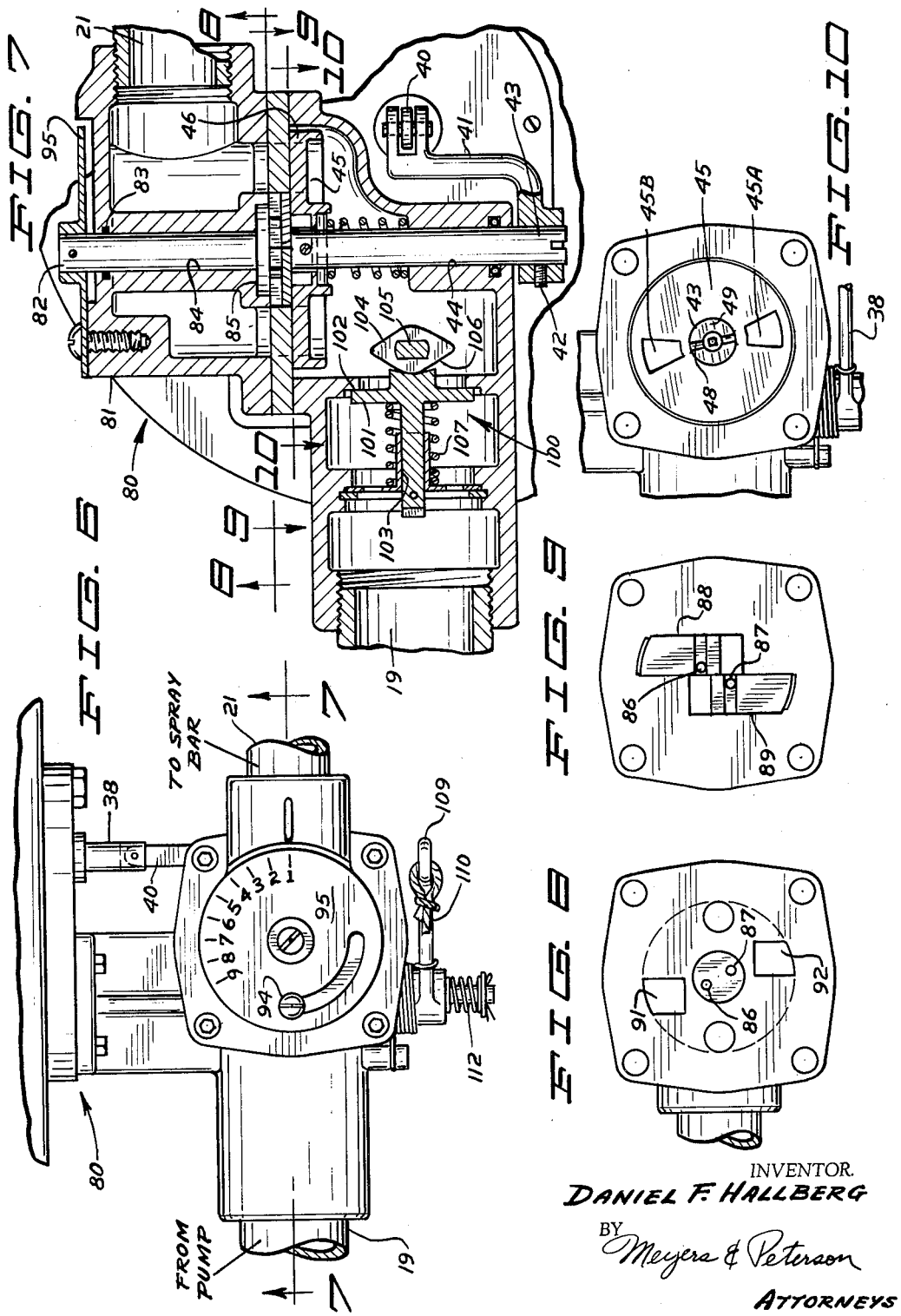

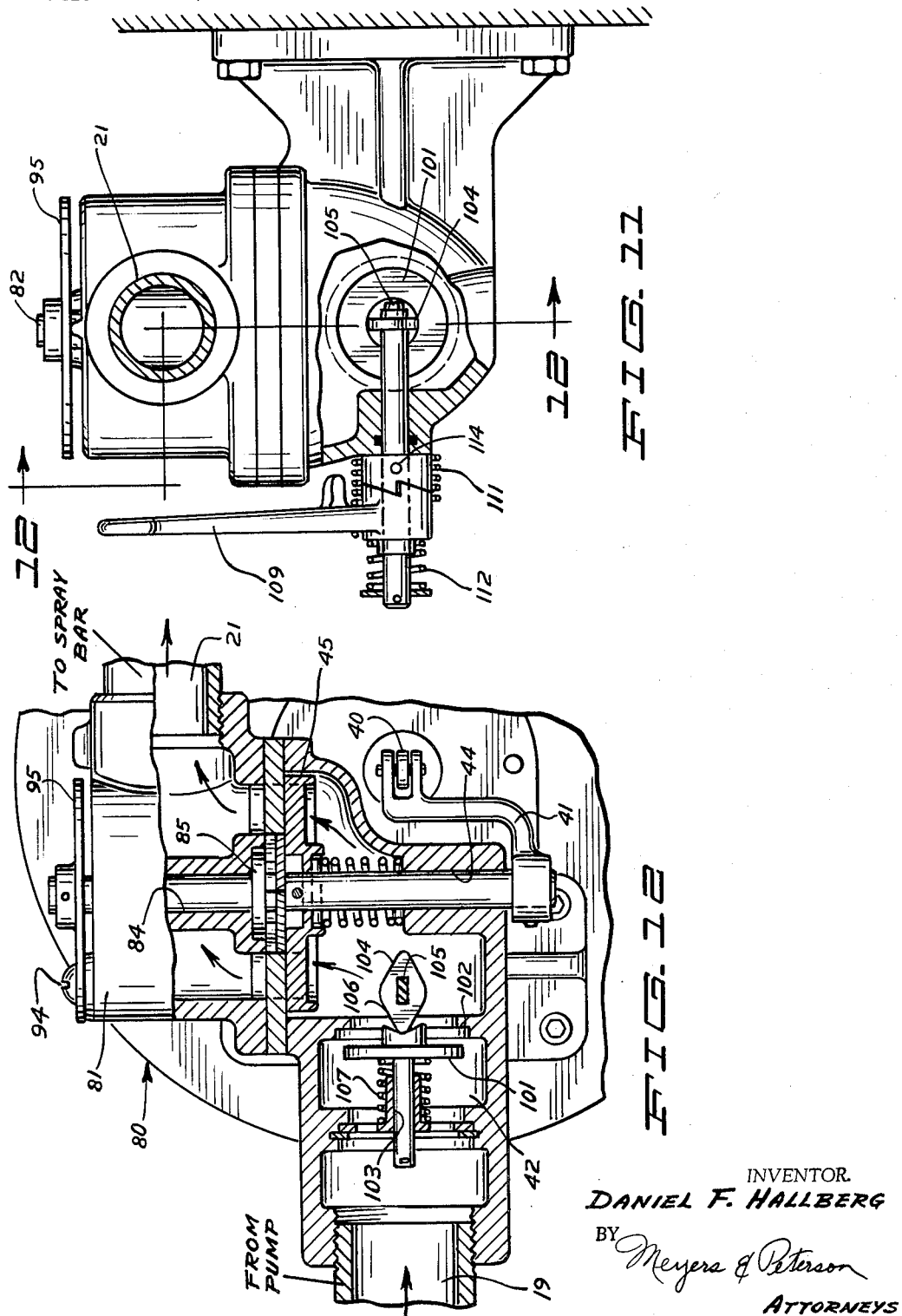

3,233,832
CONTROL UNIT IN COMBINATION WITH
AREA SPRAY SYSTEM
Daniel F. Hallberg, Minneapolis, Minn., assignor to
Hypro Inc., a corporation of Ohio
Filed Jan. 28, 1964, Ser. No. 340,598
10 Claims. (Cl. 239—155)

The present invention relates generally to a system which is adapted to apply fluids over a surface to be treated at a uniform rate of coverage, the system accommodating changes in relative rates of speed between the applicating equipment and the treated surface so as to render the output of the system variable and in agreement with the rate of speed or relative movement between this equipment and the surface being treated. The area application equipment system of the present invention includes a further adjustable feature in combination with the speed adjustment provision which permits different basic rates of application of various fluids with only one set of spray nozzles.

The apparatus is adaptable to conveyor systems wherein the treatment surfaces moves, and is particularly adapted for use with systems wherein the spray equipment moves, such as in soil treatment operations. In the application of fluid soil treating materials, such as fumigates, insecticides, fertilizers, herbicides and the like, while in liquid state, whether or not in an emulsion form, suspension form or true solution, the rate of application is generally extremely critical. For example, excessive rates of application may destroy or damage a cash crop present in the area being treated. If, on the other hand, the rate of application is below the desired quantity, the desired effect of the application may be substantially minimized, and even possibly nullified. Therefore, extreme care must be taken in uniformly applying a quantity of material to the surface being treated. One convenient technique of applying liquid soil treating materials is by use of a reservoir having at least a part of the liquid stored therein, and wherein a source of pressure such as a compressor or a pressure regulating valve is available to maintain the fluids being delivered to the discharge conduit under a substantially constant pressure. A discharge conduit is utilized to transfer the fluids from the reservoir and into the discharge nozzles, and between the reservoir and the nozzles, a valve prepared in accordance with the present invention is interposed in order to control the rate of application of the product being sprayed. In this connection, the valve is initially adjusted to control the size of the orifice in accordance with a preselected value depending upon the physical nature of the material being discharged. In addition, a second orifice adjustment is provided, the second adjustment being responsive to speed and being actuated by a speed responsive governor means. Therefore, this orifice arrangement includes a pair of orifice or baffle means, the area of the first orifice being pre-set at a certain level, the area of the second orifice being adapted to be controlled by the relative movement between the discharge means and the surface being treated, that is, opened upon an increase in velocity, and closed upon a decrease in velocity. Therefore, the rate of application of the fluid to the area being treated is variable and depends upon the relative rate of speed between the applicator and the surface being treated. In addition to the other control valves, shut-off means are provided in order to interrupt or close-off all flow through the system when discharge is not desired. This, of course, permits the unit to be transported over areas where treatment is not desired or indicated, while still making it possible to maintain the spray unit under working pressure. In order to determine the rate of movement of the vehicle, an idler wheel is provided which rotates at rate dependent upon the speed at which the vehicle is traveling. The wheel is linked to a governor, and the governor is in turn linked to the control valve. In this manner, it is possible to modify the rate at which the material is discharged through the output nozzles on a speed-dependent basis.

Briefly, the spray equipment system of the present invention includes a structure for supporting a reservoir, a source of material to be sprayed, the material being delivered at a constant pressure. A conduit is provided between the reservoir and the discharge area, the output at the discharge being distributed by various techniques such as, for example, by use of a spray bar. A valve is interposed along the conduit in order to control the rate of flow between the reservoir and the discharge or output spray area. The valve includes a body having a passageway therein of predetermined magnitude along with two adjustable orifice plates or baffles arranged in series and in combination with the valve passageway. The first orifice or baffle plate is adapted to baffle or maintain the openings at a certain predetermined constant level or magnitude. In this regard, the first adjustment is to permit the equipment to accommodate a range of viscosities, densities and the like in order that, under various operating conditions, certain predetermined or identical rates of flow will occur. The second adjustable orifice which operates in combination with the valve passageway and the first orifice plate is operatively associated or linked with a speed controlled governor, the baffle effect of the second adjustable orifice therefore being solely dependent upon the speed at which the vehicle is traveling. As the speed is increased, the valve opening is proportionally increased. In addition to the various orifices, baffles and the like, an independent shut-off valve is provided in series with the valve described hereinabove. Thus, the flow of fluids may be interrupted between the reservoir and the discharge nozzle or spray bar, except when desired. This feature permits the unit to be transported from one area, location or the like to another, as the user requires with the resrevoir being maintained under pressure.

Therefore, it is an object of the present invention to provide an improved area application system which is adapted to dispense fluid at a certain preselected specific rate, the rate of application being independent of the relative rate of movement between the applicator and the area being treated.

It is yet a further object of the present invention to provide an improved area application system adapted to dispense fluid at a substantially uniform rate of coverage across the surface being treated, the system further including means for adjusting an orifice in accordance with the physical parameters of various materials being sprayed.

It is yet a further object of the present invention to provide an improved area application system which is adapted to dispense fluids over a surface being treated at a substantially uniform coverage rate, this system including a valve which is adapted to meter the rate of discharge of the fluid from the system, a first metering means providing a rate of discharge which is independent of the relative speeds between the applicator and the surface being treated, and second metering means adapted to provide a second baffle for said system, which is dependent upon the rate of speed of the vehicle across the surface being treated.

Other and further objects of the present invention will become apparent to those skilled in the art upon a study of the following specification, appended claims, and accompanying drawings wherein:

FIGURE 1 is a top plan view of a vehicle having the area application system of the present invention mounted thereon, a portion of the equipment being broken away, and also showing a portion of a tractor which is being utilized to transport the spray system;

FIGURE 2 is a front elevational view of the equipment shown in FIGURE 1;

FIGURE 3 is a vertical sectional view taken along the line and in the direction of the arrows 3—3 of FIGURE 2, and showing, on a somewhat enlarged scale and partially in section, the metering valve component of the system;

FIGURE 4 is a partial vertical sectional view, on a still larger scale, showing the speed responsive component of the metering valve shown in FIGURE 3;

FIGURE 5 is a front view, partially broken away, of the valve shown in FIGURE 3;

FIGURE 6 is a detail top plan view, on a somewhat further enlarged scale, showing the selector orifice plate actuating mechanism, the view being taken along the line and in the direction of the arrows 6—6 of FIGURE 5;

FIGURE 7 is a vertical sectional view taken along the line and in the direction of the arrows 7—7 of FIGURE 6;

FIGURE 8 is a horizontal sectional view taken along the line and in the direction of the arrows 8—8 of FIGURE 7, and illustrating the passageway which is preformed in the flow control valve body;

FIGURE 9 is a horizontal sectional view taken along the line and in the direction of the arrows 9—9 of FIGURE 7, and illustrating the baffle plates or orifice plates utilized to pre-set the valve to a certain maximum which is a rate independent of the speed at which the vehicle is traveling;

FIGURE 10 is a horizontal sectional view taken along the line and in the direction of the arrows 10—10 of FIGURE 7 and illustrating the speed dependent orifice plate of the flow control valve;

FIGURE 11 is an end view of the apparatus shown in FIGURE 6 including a partial section through the shut-off valve; and FIGURE 12 is a front elevational view of the apparatus shown in FIGURE 7, partially broken away, and showing the shut-off valve in an alternative setting.

In accordance with the preferred modification of the present invention, the area application assembly shown in FIGURE 1, and generally designated 10 includes a flat vehicle or trailer bed 11 which is adapted to be supported on the axle shaft 12, along with the ground engaging wheels 13 and 14. A reservoir, tank or container 16 is mounted on the bed 11, a pressure such as a compressor 17 being utilized to provide a substantially constant internal pressure within the confines of the reservoir 16. As an alternative, pressure regulating means may be utilized, if desired. Sufficient capacity is available from the compressor 17 to maintain a substantially constant predetermined pressure head regardless of the rate of discharge of the fluids contained within the reservoir. The reservoir 16 may be filled through the filler port 18, a fluid tight cap being provided on the port 18 for maintaining the pressure within the system. A main delivery conduit 19 extends from between the reservoir chamber 16 and the metering valve generally designated 20, and a second conduit 21 extends from the metering valve 20 outwardly to the discharge spray bar, nozzle bar, or the like 22. Spray nozzle bar 22 is provided with a plurality of nozzles or orifices for discharging the fluid contained within the reservoir 16 onto the surface being treated, particularly as is shown in FIGURE 2 of the drawings. In order to transport the vehicle 11, a suitable hitch means or the like is provided at 24 for hitching the trailer to a suitable pulling vehicle such as a tractor or the like.

As indicated in FIGURES 1 and 2, an idler wheel 25 is provided along the surface of the main wheel 13, idler 25 being mounted for rotating about a central axis or shaft such as at 26, the shaft being mounted or secured within the sleeved housing 27. While the idler wheel 25 has been shown as being provided along the surface of a main wheel 13, it will be appreciated that an independently suspended wheel may be utilized in order to monitor the speed at which the vehicle is being transported. It is preferable, however, that the idler wheel be adapted to engage either the surface of the area being treated, or a wheel which is not powered. In other words, when a slippery or muddy condition is encountered, a powered wheel will tend to give a false indication of speed to an idler wheel such as the wheel 25. Geared pulley wheel 28 is secured to the shaft 26 and is free to rotate therewith at a rate determined, of course, by the speed of rotation of the wheel 25. A chain belt 29 or the like is utilized to transmit the rotational energy from the pulley 28 to a second smaller driven pulley 30, the pulley 30 being keyed to governor control shaft 31. Governor control shaft 31 is utilized to drive the speed responsive governor assembly of the valve of the present invention, the speed of rotation of the shaft 31 being, of course, indicative of the speed at which the system is being transported across the surface being treated.

Attention is now directed to FIGURES 3 and 4 of the drawings for a detailed description of the speed responsive governor portion of the present invention. The system is designed to deliver fluid at a pressure at the nozzles which varies as a function of the square of any change in rate of speed. Referring briefly to the operation of this portion of the apparatus, the rate of rotation of the shaft driving the governor mechanism will, in turn, determine the angular rotational setting of one portion of the control baffles making up the composite passageway or port of the volume control or metering valve mechanism. This specific baffle is illustrated in FIGURE 10 of the drawings. Referring now to the governor control unit or portion of the valve specifically, the valve being generally designated 35, the unit includes a housing 36 retaining therein the rotating governor mechanism generally designated 37 and the axially movable or slidable control rod 38 which is operatively associated therewith. As indicated previously, the control rod 38 is operatively connected to the plate 45 by means of the pin 39 which connects to the pivotal link 40, link 40 likewise being secured by means of a pin to the end of crank arm 41. Arm 41 is secured by means of a key, set screw or the like such as at 42, to rotatable valve shaft 43. The shaft 43 is mounted for axial rotation along one end to the sealed bore area 44 and at the other end, the rotatable or valving surface of the orifice plate 45 rotates adjacent to the inner housing area 46. A pair of pins 48, 49 are disposed radially within the shaft 43, and extend outwardly from the periphery thereof at 90 degrees relative positions to link orifice plate 45 with shaft 43 both radially and axially.

Returning now to the details of operation of the governor 35 as shown in FIGURES 3 and 4, the shaft 31 which is driven by means of the sprocket 30 is mounted axially within the main housing 36 by a suitable sleeve bearing or the like as shown at 51. If desired, a suitable seal 52 may be interposed between the housing 36 and the gear retaining hub 53. The gear retaining hub 53 is secured to the shaft 31 by means of the set-screw 54, although it will be appreciated that keys and the like may be utilized in lieu of the set-screw 54. A drive gear 55 is secured to the hub 53, the gear 55 meshing with the gear 56 to provide a substantial speed increase for the shaft upon which gear 56 rotates. An increase in the range of about 30:1 is normally desired with respect to the ground speed for proper operation of the governor mechanism such as is shown at 37. The increase in speed for the governor provides additional force without additional mass. The size of the unit may accordingly remain small. It will be appreciated, of course, that other ratios may be satisfactory when other assemblies are being utilized. Gear 56 is keyed for rotation with shaft 57, shaft 57 being adapted for rotation within the housing 36 by means of the bushing or bearing as at 58. At the opposite end of the shaft 57, and mounted for rotation therewith, is the arm yoke 60 of the governor mechanism generally designated 37. A suitable locking nut mechanism as at 61 is utilized to threadably engage the terminal end of the shaft 57 to mount the yoke 60 for rotation with the shaft 57. Suitable retainers, as desired, are interposed between the yoke member 60 and the shaft 57, as at 63.

Turning now to the governor mechanism 37 in more detail, it is observed that the arm yoke 60 has the pivotally mounted arms 65–65 secured angularly symmetrically thereto by means of the pivot pins as at 66–66. In this connection, the arms 65–65 are adapted to be thrust outwardly by centrifugal force generated from the energy of rotation of the shaft 57. The centrifugal force which tends to pivot the arms 65–65 outwardly about the pins 66–66 must counteract the effect of the compression spring 68 which urges the governor shaft 38 inwardly toward the yoke member 60. Of course, suitable seating means is provided for the spring 68, along with suitable bearing means for the shaft 38 as illustrated generally at 68A. A suitable rotatable bearing plate surface as shown at 69 serves as a base for the pressure exerting cam-like surface 65A of the governor arms 65–65, a suitable bearing 70 being interposed between the radially rotating surface 69 and the axially movable shaft 38. The surfaces of the cam 65A have profiles which will correspond to the flow rate profile, that is, a doubling of speed of the unit will provide quadrupling of the pressure available at the discharge nozzles. This flow rate profile may, of course, be designed into the orifices as well. Inasmuch as the thrust provided by the centrifugal force acting on the governor arms 65–65 may be small or minimal, and in order to assist in the calibration, a fine internally bored bearing surface such as Teflon or the like is provided at 72 in order to radially retain or guide the stub shaft 71 which extends from the bearing surface 69. A similar fine bore is provided where the shaft 38 leaves the housing, a Teflon sleeve being used, if desired. The governor assembly is therefore isolated from the remainder of the control unit. Thus, the reaction to the centrifugal force built up by rotation of the governor arm 65 will be substantially exclusively that compressional force provided by the spring 68, the frictional forces involved being, of course, substantially minimized. The speed of rotation of the shaft 57 will accordingly determine the magnitude of the centrifugal force urging the arms 65–65 outwardly, and accordingly this force will determine the axial positioning of the shaft 38. It is, of course, desirable that the compressional forces provided by the spring 68 be substantially linear within the range being utilized. Thus, the output of the governor 65 will be predictable, and the fluid output of the mechanism can be conveniently calibrated. As indicated previously, the axial position of the shaft 38 will determine the relative agnular disposition of the orifice disc 45 as shown in detail in FIGURE 10 of the drawings.

It is generally preferable that a certain minimum rate of speed be established before the rate dependent orifice plate be opened or commence functioning. This is accomplished by simply pre-loading the compression spring 68 to a certain level, which level must be achieved by an equal and opposite load from the centrifugal force generated by the rotation of the governor mechanism. In this regard, a vehicle speed of, for example, three miles per hour may be required in order to generate sufficient centrifugal force to urge the arms 65–65 outwardly a sufficient distance to have their camming surfaces establish any axial movement of the shaft 38. It will be appreciated that any convenient speed or pre-setting may be utilized in order to initiate control of flow rate of material through the valve system. Of course, as an alternative technique, the angular disposition of the plate 45 may be pre-set in order to maintain the passageway closed until a certain minimum speed is obtained with the vehicle. Normally, the system will provide a minimum opening for a minimum speed under the working pressure. This provides a minimum delivery rate at all times.

Turning now to the selector portion of the apparatus of the present invention, attention is directed to FIGURES 6, 7, 8 and 9. The selector mechanism is, as previously indicated, specifically adapted to control the area of the passageway available to the fluid under pressure, and has a selector valve operating in series with the governor controlled valve and being independent of speed. While the governor controlled valve is dynamic in nature, it will be appreciated that the selector valve is static and hence one setting thereof will normally be made in order to calibrate the output of the valve for a material of given physical characteristics including viscosity, density, and the like, these being taken in conjunction with the pressure being maintained in the reservoir 16. The selector orifice generally designated 80 is retained within the housing 81, and its effect on output is adapted to be superimposed upon the governor controlled orifice mechanism. In this regard, the selector valve mechanism includes a shaft 82 which is sealed at 83 and mounted for rotation within the bore 84, the shaft 82 extending from the exterior into the area of the collar 85. The collar 85 has a pair of axially extending radially displaced pins 86 and 87 which extend inwardly to the radially slidable calibrating plates 88 and 89. These plates 88 and 89 are adapted to cover, baffle, or otherwise impede the area of the passageway defined by the openings at 45A and 45B, and 91 and 92, the extent of radial movement of the plates 88 and 89 being determined by the angular disposition of the shaft 82 the clockwise rotation thereof causing the plates 88 and 89 to open inwardly providing adjustable openings in relationship with the ports 45A and 45B. Thus, with the physical characteristics of the composition being sprayed being known to the operator, the lock screw 94 is loosened, and the shaft 82 is moved to the angular disposition desired. Suitable marking indicia are indicated on the face of the plate 95 which is, of course, adapted to move integrally along with the shaft 82. Therefore, the area of the ports 45A and 45B, in combination with the areas pre-set by slidable plates 88 and 89 available to the conduits 19 and 21 will be determined by the combined effects of the static setting of the shaft 82 along with the dynamic position assumed by the orifice plate 45, the area of the aperture defining a certain predetermined flow rate for a certain predetermined pressure head available. Since the plates 88 and 89 move radially linearly, and cover a portion of the arcuately movable ports 45A and 45B, the relative flow rate ratios will remain the same for the speed portion of the control.

Attention is now directed to the shut-off mechanism shown at 100. The shut-off mechanism includes a valve plate 101 having a face which seats against the seat area 102. The stem of valve 100 is adapted for axial movement within the bore 103. An actuating cam 104 is adapted for rotation along and on the cammed rod 105, the faces of the cam being received in a detent area 106 of the valve mechanism 100. The included angle of the detent 106 is relatively large in order that it will be capable of keeping and maintaining the position assumed by the cam 104. Spring 107 is utilized to provide compressional seating force urging the valve 101 against the seat 102, and likewise against the surface of the cam 104.

Attention is now directed to FIGURES 3, 5 and 6 which illustrate the mechanism for actuating the shut-off valve 100. The actuating arm or crank 109 is connected to the cable 110 which is adapted to be pulled or actuated by the operator of the equipment. Tension on the cable 110 rotates the shaft 104 in the counterclockwise direction for an angular distance of approximately ninety degrees. This is sufficient to change the valve 100 from a closed to an open position, or vice-versa. In order that the same directional rotation technique may be employed in each instance, the shaft 104 is coupled to the crank ram 109 by means of a rachet assembly at 111. The rachet assembly is provided with a spring loaded compression spring 112 which urges the arm 109 back to its original retracted position. A suitable coupling pin such as the pin 114 is utilized to transmit the energy of rotation from the arm 109 to the shaft 104.

In operation, the operator initially fills the reservoir 16 with the desired spray material and starts the pressure mechanism such as the compressor 17, the shut-off valve 100 being held in closed position. The selector valve 80 is then moved to the desired axial position as determined by the physical properties including viscosity, density, and the like of the material being sprayed. At the start of the cycle, the operator opens the shut-off valve 100 and starts moving the equipment across the surface to be treated. The movement, of course, causes rotation of the idling wheel 25, the energy then being transmitted along to the governor mechanism 37. It is normally desirable that a certain minimum rate of speed be attained before the centrifugal force throwing the governor arms 65 outwardly will be adequate to overcome the compressive strength of the spring 68. When this minimum level has been achieved, the shaft 38 will move axially in a direction determined by the disposition of the arms 65, the force being transmitted by the cam surface 65A. Axial movement of the shaft 38 rotates the crank arm 41 about the axis of the shaft 43. As the speed is increased, the shaft 43 rotates in a clockwise direction and thereby advances the position of the individual ports 45A and 45B of the orifice plate 45 and the opening formed thereby. As the angular disposition moves further in a clockwise direction, a greater portion of the area defined by the ports 91, 92 along with the plates 88 and 89 will be made available in the juncture between the conduit 19 and 21. As the area increases, the volume of fluid delivered will accordingly increase.

It will be appreciated by those skilled in the art that the various specific modifications disclosed herein are for purposes of illustration only and are not to be otherwise construed as a limitation of the scope of the present invention.

What is claimed is:

1. In a fluid discharge system adapted to dispense fluids over a surface to be treated at a substantially uniform rate of coverage and having means for supporting a reservoir for storing said fluid, means for maintaining fluid leaving said reservoir under a certain predetermined pressure, fluid discharge means, fluid coupling means extending between said reservoir and said fluid discharge means, and valve means disposed along the said coupling means for metering the rate of discharge of said fluid; said valve means including a body having a passageway therein, first and second relatively movable mutually adjacent orifice means coupled to said valve and said passageway, each having baffle means arranged to impede the flow of fluids through said passageway, selector means coupled with said first orifice means for positioning said last mentioned means to establish a certain predetermined extent of baffle along said passageway, speed responsive means sensing the relative speed of movement between said discharge means and the surface being treated and being coupled with said second orifice means for positioning said second orifice means to adjust the extent of baffle of said second orifice means along the opening defined by said first orifice means.

2. The fluid discharge system as defined in claim 1 being particularly characteried in that said second orifice means is adapted to remain stationary until said speed responsive means senses a certain predetermined speed for said vehicle.

3. The fluid discharge system as defined in claim 1 being particularly characterized in that said second orifice means is arranged to move linearly radially with respect to a certain point, and said second orifice means is arranged to move arcuately relative to said certain point.

4. In a fluid discharge system adapted to dispense fluids over a surface to be treated at a substantially uniform rate of coverage and having means for supporting a reservoir for storing said fluid, means for maintaining said fluid leaving said reservoir under a certain predetermined pressure, fluid discharge means, conduit means extending between said reservoir and said fluid discharge means, and valve means disposed along the said conduit for metering the rate of discharge of said fluid; said valve means including a body having a passageway therein, first and second relatively movable mutually adjacent orifice means operatively coupled to said valve, each orifice means having a baffle means arranged to impede the flow of fluids through said passageway, selector means coupled with said first orifice means for positioning said last mentioned means to adjust the extent of baffle along said passageway to a certain predetermined level, speed responsive means sensing the rate of speed of relative movement between said discharge means and said surface to be treated and being coupled with said second orifice means for dynamically positioning said second orifice means to adjust the extent of baffle of said second orifice means in response to the rate of speed of movement sensed by said speed responsive means.

5. The fluid discharge system as defined in claim 4 being particularly characterized in that shut-off means are provided along said conduit in series relationship with said metering valve.

6. The fluid discharge system as defined in claim 5 being particularly characterized in that said shut-off valve is actuated by a rotary cam member, and is arranged to move arcuately in one direction.

7. In a fluid discharge system adapted to dispense fluids over a surface to be treated at a substantially uniform rate of coverage and having means for supporting a reservoir for storing said fluid, means for delivering said fluid from said reservoir at a certain predetermined pressure, fluid discharge means, conduit means extending between said reservoir and said fluid discharge means, means for moving said discharge means relative to the surface being treated, and valve means disposed along the said conduit for metering the rate of discharge of said fluid; said valve means including a body having a passageway therein, first and second relatively movable mutually adjacent orifice plates operatively coupled to said valve, each orifice plate having a baffle means arranged to impede the flow of fluids through said passageway, selector means coupled with said first orifice plate for positioning said plate to adjust the extent of baffle along said passageway to a certain predetermined maximum level, speed responsive means including a centrifugal governor for sensing the rate of relative motion, said centrifugal governor being operatively coupled with said second orifice plate for dynamically and angularly positioning said second plate relative to said passageway and said first orifice plate to adjust the extent of baffle of the second plate with the opening defined by said passageway and said first orifice plate, the angular disposition of said second orifice plate being determined in response to the rate of speed of movement sensed by said speed responsive means.

8. The fluid discharge system as defined in claim 7 being particularly characterized in that indicia means are arranged along said first relatively movable orifice plate in order to indicate the relative disposition thereof with respect to said passageway.

9. The fluid discharge system as defined in claim 7 being particularly characterized in that locking means are provided to maintain said first orifice plate at a desired position relative to said passageway.

10. The fluid discharge system as defined in claim 7 being particularly characterized in that said first orifice plate moves radially linearly and said second plate moves arcuately about a certain fixed point.

References Cited by the Examiner

UNITED STATES PATENTS

| | | | |
|---|---|---|---|
| 1,210,069 | 12/1916 | Hendricks | 239—62 |
| 1,856,825 | 5/1932 | Alphonso | 137—625.31 |
| 2,031,262 | 2/1936 | Hill | 239—156 |
| 2,159,319 | 5/1939 | Cartwright | 239—156 |
| 2,662,795 | 12/1953 | Bartling | 239—156 |
| 3,014,489 | 12/1961 | Lamp | 137—625.31 |

FOREIGN PATENTS 9,498    1906    Great Britain.

M. HENSON WOOD, Jr., *Primary Examiner.*

EVERETT W. KIRBY, *Examiner.*

UNITED STATES PATENT OFFICE
CERTIFICATE OF CORRECTION

Patent No. 3,233,832                          February 8, 1966

Daniel F. Hallberg

It is hereby certified that error appears in the above numbered patent requiring correction and that the said Letters Patent should read as corrected below.

Column 1, line 22, for "surfaces" read -- surface --; column 7, line 9, for "ram" read -- arm --; column 8, line 6, for "second" read -- first --.

Signed and sealed this 17th day of January 1967.

(SEAL)
Attest:

ERNEST W. SWIDER
Attesting Officer

EDWARD J. BRENNER
Commissioner of Patents